United States Patent
Colineau et al.

(10) Patent No.: US 7,460,456 B2
(45) Date of Patent: Dec. 2, 2008

(54) RADIAL CONTROL METHOD FOR A DEVICE FOR REPRODUCING INFORMATION OF AN OPTICAL DISK, AND REPRODUCTION DEVICE FOR CARRYING OUT SAID METHOD

(75) Inventors: Joseph Colineau, Bures sur Yvette (FR); Jean-Claude Lehureau, Sainte Genevieve des Bois (FR)

(73) Assignee: Thales (FR)

( * ) Notice: Subject to any disclaimer, the term of this patent is extended or adjusted under 35 U.S.C. 154(b) by 465 days.

(21) Appl. No.: 10/510,201

(22) PCT Filed: Mar. 25, 2003

(86) PCT No.: PCT/FR03/00942

§ 371 (c)(1),
(2), (4) Date: Jun. 29, 2005

(87) PCT Pub. No.: WO03/083844

PCT Pub. Date: Oct. 9, 2003

(65) Prior Publication Data

US 2006/0062097 A1    Mar. 23, 2006

(30) Foreign Application Priority Data

Apr. 2, 2002    (FR) .................................. 02 04077

(51) Int. Cl.
    *G11B 7/00*    (2006.01)
(52) U.S. Cl. .................................. 369/53.34; 369/44.27
(58) Field of Classification Search ........................ None
    See application file for complete search history.

(56) References Cited

U.S. PATENT DOCUMENTS

| 4,544,838 | A | * | 10/1985 | Musha et al. ............ 369/44.34 |
| 4,785,441 | A | | 11/1988 | Tanaka et al. |
| 5,168,485 | A | | 12/1992 | Lehureau et al. |
| 5,172,368 | A | | 12/1992 | Lehureau |

(Continued)

FOREIGN PATENT DOCUMENTS

FR    2805382    8/2001

(Continued)

OTHER PUBLICATIONS

Machine translation to Fukushima et al. (JP 10-21559 A).*

(Continued)

*Primary Examiner*—Peter Vincent Agustin
(74) *Attorney, Agent, or Firm*—Lowe Hauptman Ham & Berner, LLP

(57) ABSTRACT

The invention relates to a radial slaving method and to a reproduction device implementing it for optical discs.

In an optical head of a conventional reproduction device using a four-quadrant detector with four photodiode is distributed on either side of a direction parallel to the axis of the track, the individual signals of the photodiodes (d1 to d4) are combined in order to obtain read signals along the two diagonals (diag1, diag2) by subtraction (21, 22).

A phase comparison signal circuit (100) makes it possible to construct a radial error signal (Sr) by measuring the phase shift of the diagonal read signals.

The invention applies in particular to phase discs with slightly phase-shifting marks.

4 Claims, 4 Drawing Sheets

U.S. PATENT DOCUMENTS

| | | |
|---|---|---|
| 5,396,482 A | 3/1995 | Lehureau |
| 5,659,536 A | 8/1997 | Maillot et al. |
| 5,872,764 A | 2/1999 | Lehureau et al. |
| 6,058,093 A * | 5/2000 | Kato et al. ............. 369/124.14 |
| 6,256,285 B1 * | 7/2001 | Coombs ................ 369/112.03 |
| 6,577,561 B2 | 6/2003 | Pirot et al. |
| 6,657,930 B1 * | 12/2003 | Nomoto ................... 369/44.28 |
| 7,120,107 B1 * | 10/2006 | Takahashi et al. ...... 369/112.12 |

FOREIGN PATENT DOCUMENTS

| | | |
|---|---|---|
| JP | 10021559 A * | 1/1998 |
| JP | 10269588 A * | 10/1998 |

OTHER PUBLICATIONS

Abstract of FR 2805382 publication date Aug. 24, 2001, Philippe Graffouliere.

* cited by examiner

RADIAL CONTROL METHOD FOR A DEVICE FOR REPRODUCING INFORMATION OF AN OPTICAL DISK, AND REPRODUCTION DEVICE FOR CARRYING OUT SAID METHOD

The present invention relates to a radial slaving method for a device for reproducing information from an optical disc and to a device for reproducing information from an optical disc which implements this method.

As is known, an optical disc makes it possible to record information in an encoded form with the aid of alterations at the surface of or inside the disc, such as pits or marks with modified physical properties (for example, crystalline or magnetic state), which are arranged in one or more planes of the disc along predetermined tracks (spiralling or concentric). The stored information can be reproduced by optically exploring these alterations with the aid of a laser light beam focused at a spot on the disc. Reading of these optical discs requires very precise tracking of the position of the reading spot on the track or tracks carrying the information. This function is fulfilled by circuits for slaving the radial and vertical position of the spot. A major imperative for correctly reading the recorded information, the densities of which may be very high, is that the optical quality of the reading beam, and particularly its centering on the track being read, should be kept constant irrespective of the positions of the disc and the reading system.

Numerous methods for detecting the radial position error have been proposed. Some of them use the reading spot and photodetectors which are also used for reading the recorded information. In particular, for radial tracking in the case of DVD discs which require high precision, a method referred to as DPD (Differential Phase Detection) has been proposed in which a multi-photodiode detector of the conventional four-quadrant type is used to form two signals by adding the individual signals of photodiodes along the two diagonals of the signal, and a radial error signal is derived by observing the phase shift of the two signals which are obtained.

In spite of its merits, however, such a method cannot always be used efficiently. This is because, when marks that induce small phase shifts on the incident beam are being analysed, the signals obtained by additive combination are too weak and unusable. This is the case, in particular, for certain multi-layer phase discs with a small phase shifts induced by the marks.

It is an object of the invention to overcome these drawbacks. It is based on the use of signals which are obtained by subtraction along the diagonals of the detector, or more generally signals resulting from two reading subsystems, the sensitivity functions of which make two symmetrical angles with the axis of the track being explored, which makes it possible to obtain strong and stable signals with a high signal-to-noise ratio in all cases.

The invention therefore provides a radial slaving method for a device for reproducing information from an optical disc, in which the information stored on the disc in the form of alterations arranged along predetermined tracks of the disc is explored by a laser beam, which converges at a spot on the optical disc and results in a beam emerging from the said disc by reflection or transmission, the said device being equipped with a multi-photodiode far-field detection system for detecting the said emergent light beam, the said method being characterized in that it consists in:

combining the read signals of the said photodiodes of the said detection system so as to form two reading subsystems, the sensitivity functions of which in the plane of the disc make two symmetrical angles with the direction of the track being explored;

phase-comparing the signals obtained by each of the two subsystems in order to obtain a radial error signal substantially proportional to the radial tracking error.

An optimal radial error signal which permits extremely precise tracking of the track is thus obtained.

According to another aspect of the invention, in the case in which the detection system consists of a four-quadrant detector having two pairs of photodiodes, the photodiodes of each pair being arranged on either side of a first axis parallel to the image of the axis of the track being explored, and the said pairs being arranged on either side of a second axis perpendicular to the said first axis, the said first and second axes being axes of symmetry for the said detection system, such a method is characterized in that the said step of combining the read signals of the said photodiodes consists in taking the difference between the read signals of two photodiodes belonging to different pairs in order to form a read signal along a first diagonal of the detection system and a read signal along a second diagonal of the detection system.

According to the invention, the method as defined above may furthermore be characterized in that the said step of phase-comparing the read signals along the said first and second diagonals consists in performing a cross-correlation between each read signal of one diagonal and the signal of the other diagonal, to which a predetermined delay is assigned.

Owing to the measurement by cross-correlation, a radial error signal can be obtained in a precise and efficient way despite the deformation of the combination signals when there is a radial discrepancy.

According to another aspect of the invention, it also provides a device for reproducing information from an optical disc, in which the information stored on the disc in the form of alterations is arranged along predetermined tracks of the disc, the said reproduction device comprising a light source for providing an incident light beam, first optical means for converting the said beam at a spot on the optical disc, second optical means for splitting the beam emerging from the said disc and resulting from reflection or transmission of the incident beam by the disc, and a multi-photodiode detection system arranged in the far-field on the path of the said emergent beam in order to detect the said light beam, the said reproduction device being characterized in that it furthermore comprises:

first combination means, which receive the individual read signals of the said photodiodes in order to construct two read signals corresponding to two subsystems, the sensitivity functions of which in the plane of the disc make two symmetrical angles with the direction of the track being explored;

second phase comparison means for comparing the phases of the said two read signals of the subsystems and providing a radial error signal.

According to yet another aspect of the invention, in the case in which the detection system consists of a four-quadrant detector having two pairs of photodiodes, the photodiodes of each pair being arranged on either side of a first axis parallel to the image of the axis of the track being explored, and the said pairs being arranged on either side of a second axis perpendicular to the said first axis, the said first and second axes being axes of symmetry for the said detection system, such a reproduction device is characterized in that the said first combination means comprise two differential circuits, which respectively receive the signals of two photodiodes belonging to the two respective diagonals of the said detection system and each provide the difference between the received signals as a read signal along a first and a second diagonal.

According to the invention, the above device may furthermore be characterized in that the said second phase comparison means consist of a circuit for cross-correlation of each diagonal read signal with the signal of the other diagonal, to which a predetermined delay is assigned.

The invention will be understood more clearly, and other characteristics and advantages will become apparent, with the aid of the following description and the appended drawings, in which.

Figure 1:
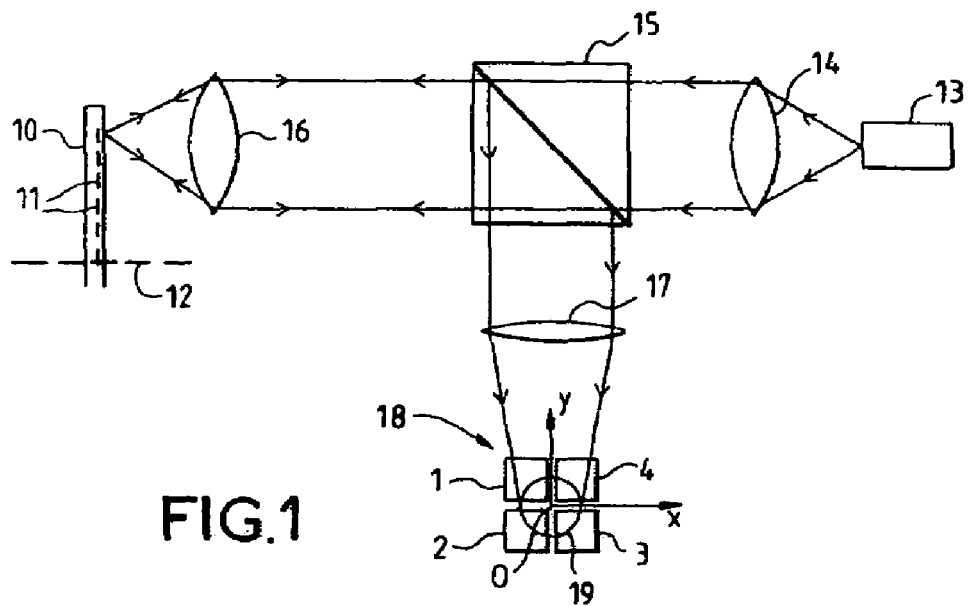
FIG. 1 is an outline diagram of an optical head of a reproduction device for an optical disc.

FIG. 1 represents the outline diagram of a conventional optical head with a multi-photodiode detector. This optical head for a device for reproducing the information carried by an optical disc comprises a laser source 13, which sends a light beam towards an objective 16 by means of optics 14 schematized by a lens and a splitter 15. This objective 16 focuses the incident beam at the spot on the optical disc 10, on which information is stored in the form of alterations arranged along predetermined tracks 11. The disc is driven in rotation about an axis 12, so that the spot explores the track moving past it. The incident light beam is either transmitted through the disc or reflected, as in this case, in order to give rise to a beam which emerges from the disc, travels back though the objective 16 and is separated from the incident beam by the splitter 15, in order to be received by a multi-photodiode detector 18 by means of optics 17, the detector 18 being placed in the far-field.

The principle of the invention consists in partitioning the detector so as to create to reading subsystems, the sensitivity functions of which in the plane of the disc make two symmetrical angles with the direction of the track. The signals formed using these two subsystems are then compared: if the system is perfectly centered, the signals are identical on both channels; if there is a positional discrepancy, however, then an asymmetry which, to first order, is proportional to the discrepancy to be measured, appears between the two channels.

To give a concrete example, and to illustrate the principle of the invention more clearly, it will be assumed that the multi-photodiode detector 18 (FIG. 1) is a four-quadrant detector comprising four photodiodes 1, 2, 3, 4 arranged in pairs. The photodiodes of each pair 1, 2 or 3, 4 are arranged on either side of a first axis Ox parallel to the image of the axis of the track being explored. The two pairs are furthermore arranged on either side of a second axis Oy perpendicular to the axis Ox, so that the axes Ox and Oy are axes of symmetry of the detector.

According to the invention, the individual signals of the photodiodes are combined in order to form two groups of diagonal signals by subtraction:

$$diag1 = d1 - d3$$

$$diag2 = d2 - d4$$

where d1 to d4 are the individual signals of photodiodes 1 to 4 and diag1 and diag2 are the read signals respectively obtained along a first and a second diagonal.

Figure 2A:
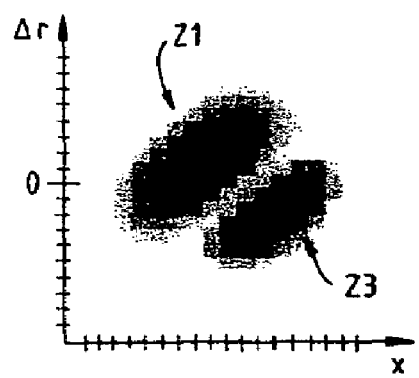
FIGS. 2A and 2B illustrate the sensitivity functions for two reading subsystems formed according to the invention.
Figure 2B:
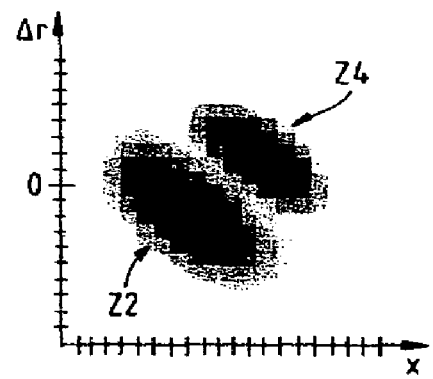

The corresponding sensitivity, or reading, functions are illustrated in FIG. 2A for the first diagonal and FIG. 2B for the second diagonal. Zones Z1 and Z3 in FIG. 2A represent maximum-sensitivity zones corresponding to photodiodes 1 and 3. Similar considerations apply to zones Z2 and Z4 in FIG. 2B for photodiodes 2 and 4.

Figure 3A:
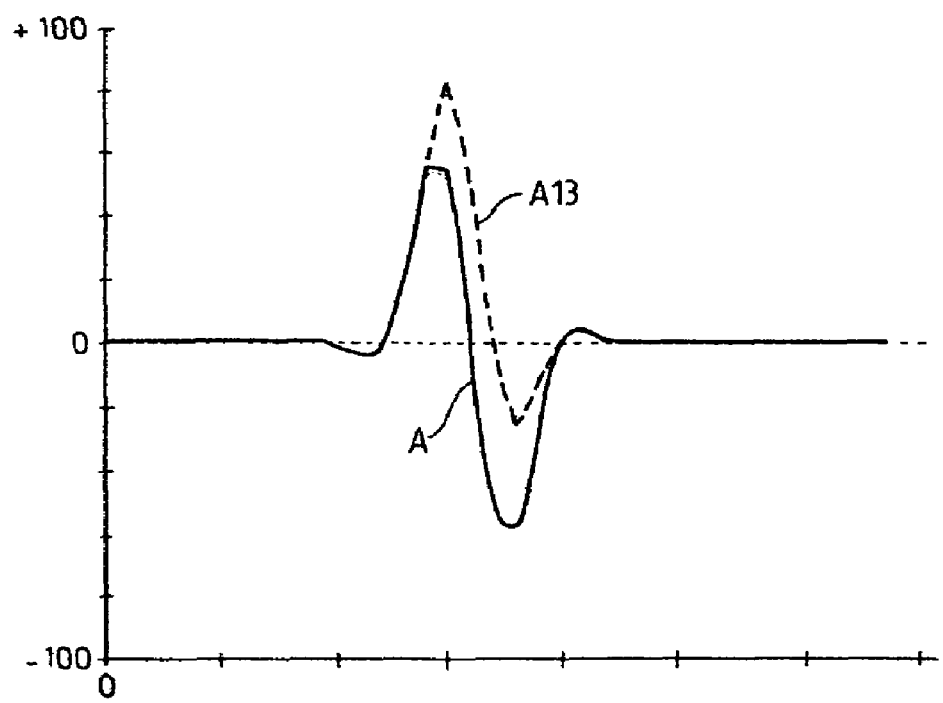
FIGS. 3A and 3B are diagrams representing the read signals obtained with the two subsystems according to the invention.
Figure 3B:
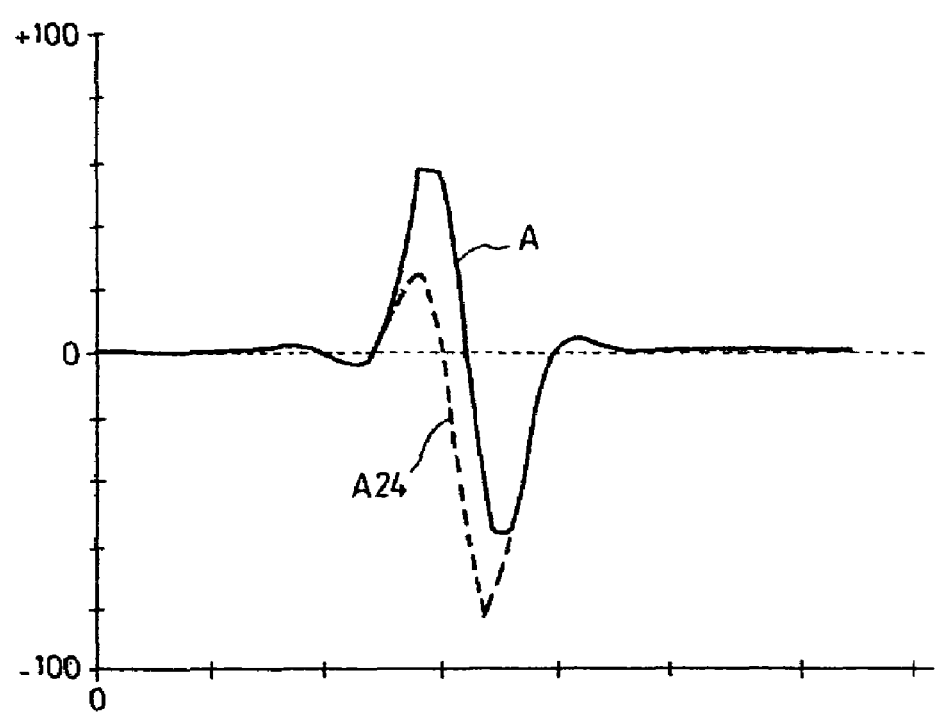

The read signals diag1 and diag2 are respectively illustrated in FIGS. 3A and 3B for an isolated mark moving in front of the incident beam, the curves indicate the amplitude of the signal as a function of the position of the mark. Curves A correspond to the case of a radially centered mark, and they are perfectly identical and in-phase. If the spot is no longer centered on the track, however, then the read signals of the two subsystems will be deformed and phase-shifted. In the case of the radial discrepancy which is illustrated, a deformed signal diag1 (curve A13) with a phase lead is obtained, whereas the signal diag2 (curve A24) has a phase lag.

Hence the opportunity according to the invention to construct an error signal, by detecting the phase shift of the read signals with respect to one another.

Figure 4:
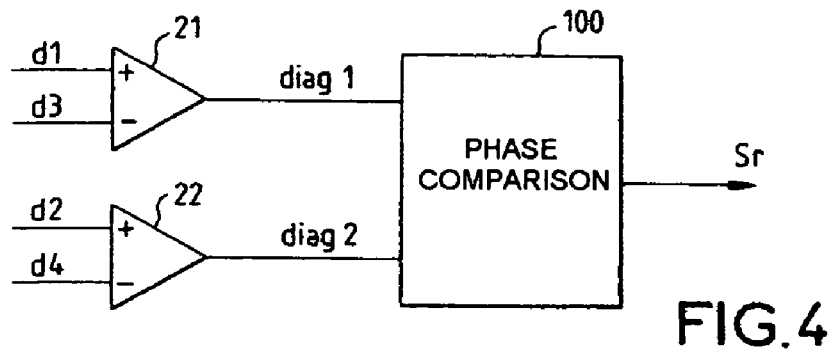
FIG. 4 is an outline block diagram of a radial error detector according to the invention.

FIG. 4 shows the diagram of a radial error detector based on this principle. Two differential amplifiers 21, 22 receive the individual signals of photodiodes d1 to d4, and signals respectively provide the read signals diag1 and diag2 by subtraction, which are sent to a phase comparison circuit 100 for constructing the radial error signal Sr.

This phase comparison circuit may be of any known type. The phase-shift measurement is complicated, however, by the fact that the signals are deformed and that it might therefore be necessary to correct the signals, by filtering, amplitude equalization, etc., before measuring the phase shift.

Figure 5:
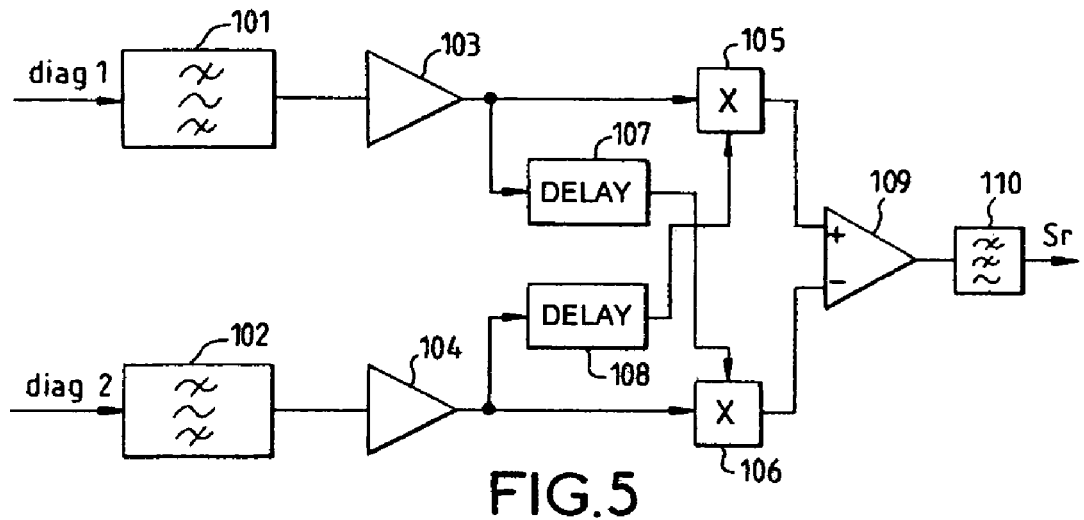
FIG. 5 is the diagram of one embodiment of an element of the detector in FIG. 4.

A much more efficient and precise method involving cross-correlation is represented in FIG. 5, which shows an embodiment of the circuit 100. It has two processing channels, for respectively processing the read signals diag1 and diag2. Each channel includes a band-pass filter 101, 102, and an amplifier 103, 104, the output of which is applied to a first input of a multiplier 105, 106 and to a delay circuit 107, 108. The output of the delay circuit of one channel is applied to the other input of the multiplier of the other channel. The outputs of the multipliers 105, 106 of the two channels are applied to a differential amplifier 109 which takes their difference; after low-pass filtering 110, this constitutes the radial error signal Sr whose sign and amplitude represent the radial positioning error Δr.

The choice of the predetermined the delay applied by the circuits 107 and 108 depends on the maximum frequency of the read signals (i.e. on the recording density and the rate of advance of the information), as well as on the modulation depth of the optical disc, that is to say the optical phase shift produced on the reading beam by the marks.

Figure 6:
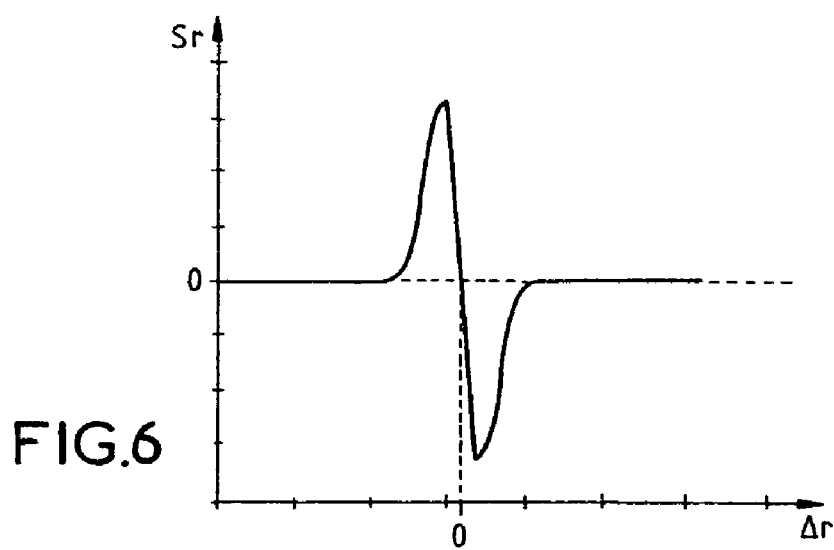
FIG. 6 shows the diagram of the radial error signal obtained according to the invention.

This delay is typically less than the clock period of the information being read (which is sometimes referred to as the "channel" bit). In fact, this delay should be less than the maximum delay (phase shift) which one diagonal read signal exhibits with respect to the other when changing from a track to the adjacent track. The radial error signal Sr, the variations of which as a function of the radial positioning error Δr are represented in FIG. 6, is obtained with the detector described above.

It is also an object of the invention to resolve a complementary problem which appears when the radial slaving loop described above (as is widely known, the radial error signal Sr is used to control a radial actuator making it possible to reposition the reading spot) is being regulated. This is because the response time of the aforementioned loop is relatively slow, which may cause trouble during track changes, jolts, etc., because the read signal experiences the phase-shift effects during the phase when the centering is being re-established.

Figure 7:
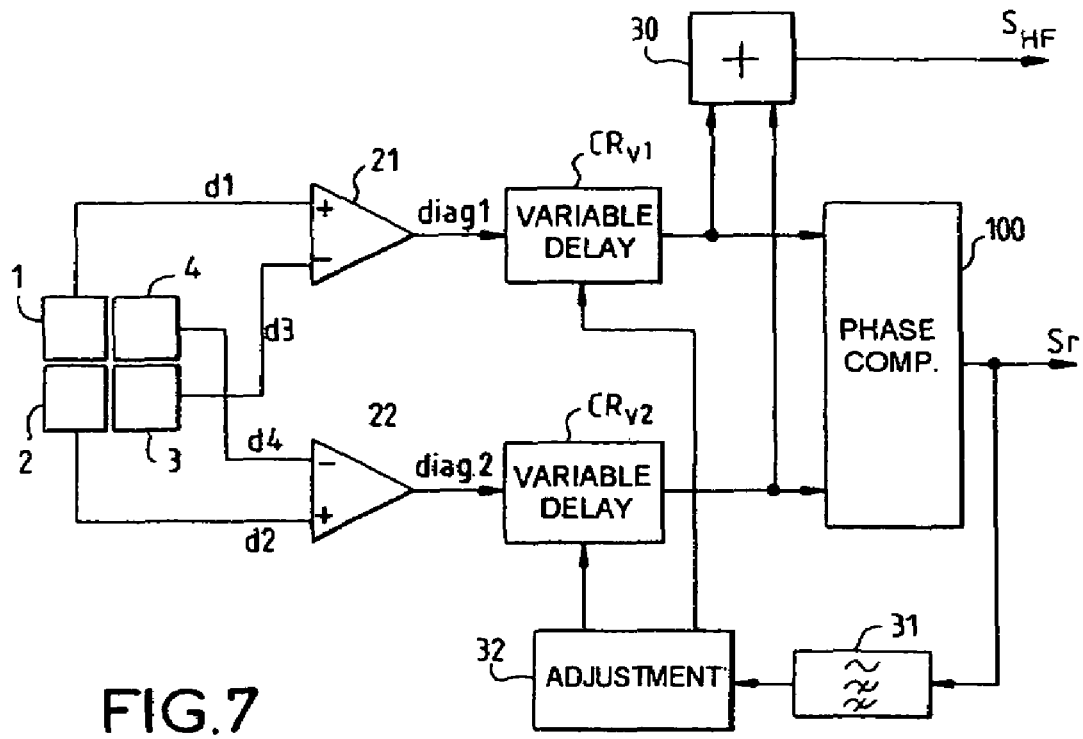
FIG. 7 is the diagram of a radial error detection circuit with electronic pre-correction according to the invention.

In order to resolve this, means are provided for rapid electronic pre-correction of the read signal by using the high-frequency part of the radial discrepancy which is measured. These means will be described with reference to FIG. 7. This figure again shows the detector with four photodiodes 1, 2, 3, 4, the two differential amplifiers 21, 22 forming the diagonal read signals diag1, diag2, and the phase comparison circuit 100. The rapid pre-correction consists in dynamically adjusting the delay of the diagonal read signals as a function of the radial error which is measured. To that end, each of the channels for the diagonal signals contains a variable delay circuit CRv1, CRv2, which has a delay control input, and an adjustment circuit 32 connected to the control inputs of the circuits CRv1, CRv2. By means of a high-pass filter 31, the circuit 32 receives the high-frequency components of the radial error signal Sr delivered by the comparator 100, the aim of this being to avoid competition between the pre-correction circuit and the main slaving loop, which processes the low-frequency part and the DC component of the spectrum of the radial slaving signal Sr.

The readout signal $S_{HF}$ of the device according to the invention is obtained by using an adder 30 to take the sum of the read signals of the diagonals. It should be noted that a strong and stable resultant read signal, with a high signal-to-noise ratio, is obtained in this way. The adjustment circuit 32 makes it possible to control the delays of the circuits CRv1, CRv2 in reverse, as a function of the sense and the amplitude of a high-frequency components of the radial error signal Sr, which makes it possible to minimize the phase-shift effects of the readout signal.

Only the high-frequency part of the signal Sr is sampled, so as to avoid reducing the gain of the main slaving radial loop which only processes the low-frequency signals.

Figure 8:
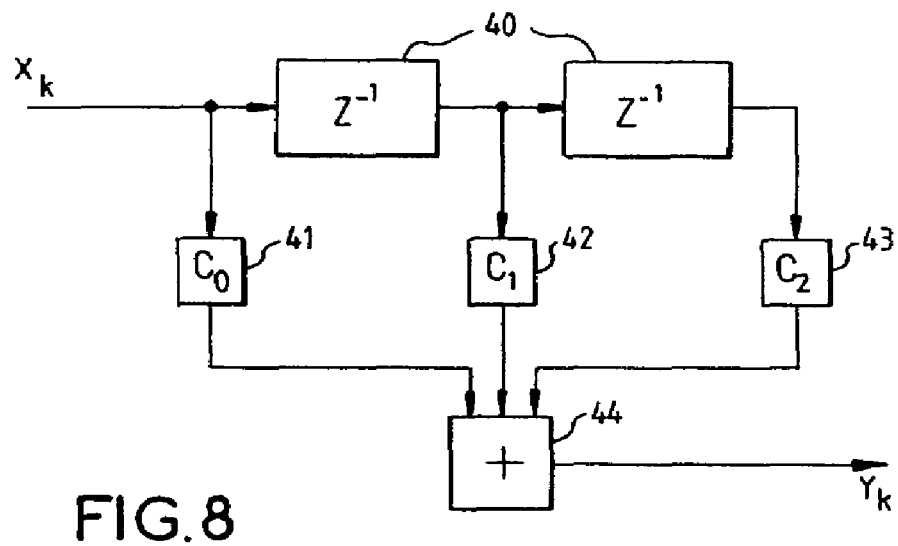
FIG. 8 is a possible embodiment of an element of the detector in FIG. 7.

The variable delay circuits CRv1, CRv2 may, for example, be produced according to the diagram in FIG. 8. The blocks 40 correspond to the application of a delay increment. The blocks 41, 42, 43 represent multipliers, respectively with the coefficients $C_0$, $C_1$, $C_2$, and the block 44 represents an adder. Such a circuit constitutes a digital filter which forms the convolution of the sequence of input samples $X_k$ by the sequence of coefficients $C_j$:

$$Y_k = \Sigma_j C_j * X_{(k-j)}$$

By selecting the coefficients $C_j$ suitably, a signal $Y_k$ identical to the delayed signal $X_k$ is obtained. These coefficients may, for example, be the Lagrange interpolation coefficients. The delay imposed on the signal can be changed by changing the value of the coefficients. This filter may be micro-programmed or produced using hard-wired operators.

The described examples do not, of course, imply any limitation of the invention. The invention is particularly suitable for reading discs with a low modulation factor, such as multi-layer phase discs, or magneto-optical discs. The electronic pre-correction furthermore improves the readout signal, especially in the transient phases (track changes, jolts, etc.). It improves the slaving performance by reducing the response times, while increasing stability and correcting for the effects of spurious resonances.

The invention claimed is:

1. A radial slaving method for a device for reproducing information from an optical disc, in which the information stored on the disc in the form of alterations arranged along predetermined tracks of the disc is explored by a laser beam, which converges at a spot on the optical disc and results in a beam emerging from the disc by reflection or transmission, the device being equipped with a multi-photodiode far-field detection system for detecting the emergent light beam, the method comprising:

combining read signals of the photodiodes of the detection system so as to form four read subsystems having two pairs of subsystems, the subsystems of each pair being arranged on either side of a first axis parallel to the image of the axis of the track being explored and having photodiodes of a four-quadrant detector, the pairs of subsystems being arranged on either side of a second axis perpendicular to the first axis, the first and second axes being axes of symmetry for the detection system, wherein combining the read signals of the photodiodes takes the difference between the read signals of two subsystems belonging to different pairs in order to form a read signal along a first diagonal of the detection system and a read signal along a second diagonal of the detection system; and phase-comparing the signals obtained by each of the two subsystems in order to obtain a radial error signal substantially proportional to the radial tracking, said step of phase-comparing the read signals along the first and second diagonals and performing a cross-correlation between each read signal of one diagonal and the signal of the other diagonal, to which a predetermined delay is assigned.

2. The method according to claim 1, wherein the predetermined delay is selected as a function of the maximum frequency of the read signals and a modulation depth of the optical disc.

3. The method according to claim 1, wherein the predetermined delay is selected to be less than the clock period of the information to be read.

4. A radial slaving method for a device for reproducing information from an optical disc, in which the information stored on the disc in the form of alterations arranged along predetermined tracks of the disc is explored by a laser beam, which converges at a spot on the optical disc and results in a beam emerging from the disc by reflection or transmission, the device being equipped with a multi-photodiode far-field detection system for detecting the emergent light beam, the method comprising:

combining read signals of the photodiodes of the detection system so as to form four read subsystems having two pairs of subsystems, the subsystems of each pair being arranged on either side of a first axis parallel to the image of the axis of the track being explored, and arranged on either side of a second axis perpendicular to the first axis, the first and second axes being axes of symmetry for the detection system, wherein combining the read signals of the photodiodes takes the difference between the read signals of two subsystems belonging to different pairs in order to form a read signal along a first diagonal of the detection system and a read signal along a second diagonal of the detection system; and phase-comparing the signals obtained by each of the two subsystems in order to obtain a radial error signal substantially proportional to the radial tracking, rapid pre-correcting to dynamically adjust the delays of the read signals along the first and second diagonals, in the channels for constructing the readout signal, as a function of the radial error signal, wherein said rapid pre-correction step:

filters the radial error signal in order to keep only the high-frequency components of the signal; and determines an inverse variation of the delays as a function of the high-frequency component values, in order to minimize the phase-shift effects of the readout signal.

* * * * *